(12) United States Patent
Buttini et al.

(10) Patent No.: US 10,201,166 B2
(45) Date of Patent: Feb. 12, 2019

(54) PROCESS FOR THE PRODUCTION OF A CHOCOLATE SNACK AND SNACK WHICH CAN BE OBTAINED USING THIS PROCESS

(71) Applicant: BARILLA G. E R. FRATELLI S.P.A., Parma (IT)

(72) Inventors: Roberto Buttini, Parma (IT); Corrado Ferrari, Parma (IT); Alessio D'Urso, Parma (IT); Giancarlo Riboldi, Parma (IT)

(73) Assignee: BARILLA G. E R. FRATELLI S.P.A., Parma (IT)

( * ) Notice: Subject to any disclaimer, the term of this patent is extended or adjusted under 35 U.S.C. 154(b) by 0 days.

(21) Appl. No.: 15/562,129

(22) PCT Filed: Mar. 30, 2016

(86) PCT No.: PCT/EP2016/056946
§ 371 (c)(1),
(2) Date: Sep. 27, 2017

(87) PCT Pub. No.: WO2016/156420
PCT Pub. Date: Oct. 6, 2016

(65) Prior Publication Data
US 2018/0077943 A1    Mar. 22, 2018

(30) Foreign Application Priority Data
Apr. 2, 2015 (IT) .............. MI2015A0478

(51) Int. Cl.
| | | |
|---|---|---|
| A21D 15/08 | (2006.01) | |
| A21D 13/34 | (2017.01) | |
| A21D 13/14 | (2017.01) | |
| A23L 3/349 | (2006.01) | |
| C12G 3/04 | (2006.01) | |
| A21D 13/24 | (2017.01) | |
| A21D 13/32 | (2017.01) | |
| A21D 13/22 | (2017.01) | |
| A23G 1/30 | (2006.01) | |
| A23G 3/34 | (2006.01) | |

(52) U.S. Cl.
CPC ............. *A21D 15/08* (2013.01); *A21D 13/14* (2017.01); *A21D 13/22* (2017.01); *A21D 13/24* (2017.01); *A21D 13/32* (2017.01); *A21D 13/34* (2017.01); *A23G 1/30* (2013.01); *A23L 3/349* (2013.01); *C12G 3/04* (2013.01); *A23G 3/0065* (2013.01); *A23V 2002/00* (2013.01)

(58) Field of Classification Search
CPC ........ A21D 13/22; A21D 13/32; A21D 13/14; A21D 13/24; A21D 13/34; A21D 15/08; A23G 1/30; A23L 3/349

USPC .................................................. 426/103, 13
See application file for complete search history.

(56) References Cited

U.S. PATENT DOCUMENTS

| | | | | |
|---|---|---|---|---|
| 4,159,348 A | * | 6/1979 | Dogliotti .............. | A23G 3/2015 426/103 |
| 2004/0213883 A1 | * | 10/2004 | Sadek .................... | A21D 10/02 426/549 |
| 2013/0108740 A1 | * | 5/2013 | Clarke ............... | A21D 13/0038 426/93 |
| 2015/0223482 A1 | * | 8/2015 | Ohara ...................... | A23G 1/36 426/549 |

FOREIGN PATENT DOCUMENTS

| | | | | |
|---|---|---|---|---|
| EP | 1316256 A1 | * | 6/2003 | ............... A21D 8/06 |
| EP | 1504672 A1 | | 2/2005 | |
| FR | 1219260 A | * | 5/1960 | ............. A21D 15/00 |
| FR | 2744593 A1 | | 8/1997 | |
| WO | WO 2009097333 A2 | * | 8/2009 | ........... A23L 3/3463 |
| WO | WO 2014034601 A1 | * | 3/2014 | ............... A23G 1/36 |

OTHER PUBLICATIONS

Liquid-vapour partition of ethanol in bakery products, Paola Pittia, Flavour and Fragrance Journal, Flavour Fragr. J. 2006; 21: 3-7.*
International Search Report for International Application No. PCT/EP2016/056946 (dated Apr. 2, 2015) (5 pages).
International Preliminary Report on Patentability for International Application No. PCT/EP2016/056946 (dated Apr. 2, 2015) (13 Pages).
Database WPI, 1983, Thomson Scientific, XP002745243. "Cake (1) consists of two sponge sheets of cake between with chocolate contg. (a) alcoholic liq. or spirit is sandwiched . . . " (Abstract).
Mintel, "Croissants with chocolate filing", 2014, XP002745244.
Pittia et al., "Ethanol activity in bakery products", International Food Information Service, 2004, XP002758836. (Abstract).

* cited by examiner

*Primary Examiner* — Jyoti Chawla
(74) *Attorney, Agent, or Firm* — Lucas & Mercanti, LLP

(57) ABSTRACT

Process for the production of a soft pastry bakery product in the form of an oblong bread roll, filled with a chocolate layer in the form of slab is disclosed. The steps include providing a semifinished product in the form of an oblong bread roll, obtained from a flour-based dough, leavened with natural yeast, followed by a baking step and then by a step of injecting a hydro-alcoholic solution so as to obtain a bakery product with a controlled moisture content. Thereafter a longitudinal cut on the bakery product is made so as to obtain a lower portion and an upper portion. A layer of melted chocolate is deposited on the upper surface of the lower portion. Also described is a snack obtained by means of the process.

21 Claims, 2 Drawing Sheets

PROCESS FOR THE PRODUCTION OF A CHOCOLATE SNACK AND SNACK WHICH CAN BE OBTAINED USING THIS PROCESS

CROSS-REFERENCE TO RELATED APPLICATIONS

This application is a 371 of PCT/EP2016/056946, filed Mar. 30, 2016 which claims the benefit of Italian Application No. MI2015A000478, filed Apr. 2, 2015.

FIELD OF APPLICATION

According to its more general aspect, the present invention relates to domain of the food and confectionery industry.

In particular, the invention relates to a snack consisting of a soft pastry filled with chocolate and a process for production thereof.

BACKGROUND OF THE INVENTION

Prior Art

As is known, one of the most tasty and traditional snacks is bread filled with chocolate in slab form. This type of snack is undoubtedly one of the snacks preferred both by children and by adults, not only because of the simple taste, but also because of the pleasing sensation to the palate provided by the contrast between the consistency and taste of bread and that of chocolate.

However, it is particularly complicated to produce industrially snacks intended for distribution which reproduce in some way the characteristics of bread filled with chocolate.

The reasons for these complications lie in the technical difficulty associated with the production of such a snack on an industrial scale and the conservation of its constituent components, i.e. bread and chocolate, at room temperature without the aid of preservatives.

It is in fact difficult to achieve, without incurring substantially high costs, the production on an industrial scale of a snack such as "bread and chocolate" by means of insertion of a preformed slab of chocolate on a soft pastry base.

Moreover it is also not possible to deposit a layer of melted chocolate onto a soft pastry base so as to form in situ a chocolate slab because the rheological characteristics of melted chocolate do not permit it: the melted chocolate, being too fluid, tends to overflow and also tends to be absorbed by the pastry, also forming a layer which is too thin.

European patent No. EP 1 504 672 discloses a composite confectionery product which comprises two layers of a bakery product, of the type consisting of a baked soft pastry roll, separated by layers of solid chocolate with a layer of cream in between. In particular, the chocolate is distributed in fluid state and, then, gradually solidifies so as to take the form of a slab.

However, it is pointed out that, although the patent EP 1 504 672 describes a snack comprising a bread roll associated with a slab of chocolate, this slab of chocolate is not directly in contact with the soft pastry of the bread roll; it thus does not reproduce the traditional snack consisting essentially of a bread roll cut longitudinally so as to form an opening inside which the slab of chocolate is inserted.

Another technical solution available is described in the patent FR 2 361 821 which relates to a confectionery product with soft pastry soaked in liqueur and coated with a thin layer of chocolate. This layer is obtained by means of deposition of chocolate in the melted state, which then solidifies on the pastry, resulting in the finished product.

Although it does not envisage the preparation of the product in the form of a slab, FR 2 361 821 envisages direct contact between a layer of solid chocolate and a soft pastry of a bakery product. However, this layer of chocolate is distributed over the outer surface of this product which consists essentially of a smooth crust without the cellular structure which characterizes the innermost layers of any soft pastry bakery product.

Furthermore, according to the present state of the art, it is also not possible to deposit a layer of melted chocolate onto a surface with a cellular structure typical of the internal layers of the soft pastry bakery product, so as to form in situ a slab of chocolate, because neither the rheological characteristics of the melted chocolate nor the morphology of any internal structure of a soft pastry roll would permit it.

In fact, the melted chocolate tends to be absorbed by the pastry, penetrating into the cellular structure which characterizes this type of product.

In this situation, on the one hand the thickness of the slab layer diminishes and, on the other hand, once the chocolate has solidified, the exchange surface area between the pastry of the bread roll and the slab increases.

Moreover, there exists a serious problem of microbiological instability of the final snack, due to the fact that the chocolate, which has a moisture content less than that of the pastry, tends to absorb the water contained therein.

The consequence of this is the tendency for proliferation of mould in the chocolate, resulting in a drastic reduction in the shelf life of the product. In particular, this negative aspect is increased by the aforementioned phenomenon: the increase in the exchange surface area between pastry and chocolate which favours the absorption of the moisture by the latter.

Finally, in addition to all the above, there is also the softening of the chocolate slab and simultaneous hardening of the pastry base which occur, with consequent loss or reduction of the pleasing sought-after contrast between the softness of the pastry base and the crunchiness of the chocolate.

It is also pointed out that the possible use of pre-formed slabs for the desired product would solve the problem of absorption of the melted chocolate in the pastry, but not that of the exchange of moisture between the different surfaces and the consequent deterioration of the product.

The problem forming the basis of the present invention is therefore that of providing a snack of the type consisting of bread filled with chocolate, which can be kept at room temperature without the addition of preservatives and which has organoleptic properties which remain substantially unchanged for the entire duration of the required shelf-life, as well as a process for the production of such a snack.

SUMMARY OF THE INVENTION

This problem is solved, according to the invention, by a process for the production of a snack comprising a soft pastry bakery product in the form of an oblong bread roll, filled with a chocolate layer in the form of a slab, which comprises the steps of:

a) making available a semifinished product in the form of an oblong bread roll, obtained from a flour-based dough, leavened with natural yeast;

b) baking said semifinished product, obtaining a bakery product in the form of an oblong bread roll having a moisture content comprised between 22% and 24% by weight of the total weight of said bakery product;

c) injecting a hydro-alcoholic solution into said bakery product, while it is still warm, in such a quantity as to bring the moisture content of said bakery product to a value comprised between 30% and 33% by weight of its total weight;

d) carrying out a longitudinal cut on the bakery product at or below half of its height and in such a way as to involve at least 80% of its length, thus obtaining a lower portion and an upper portion;

e) depositing a layer of melted chocolate onto the upper surface of said lower portion.

The bakery product obtained in step b) has a substantially flat lower surface and a substantially convex upper surface.

The bakery product obtained in the aforementioned baking step b) has a value of $A_w$ equal to 0.81-0.85. Following step c) of injecting the aforementioned hydro-alcoholic solution, the bakery product assumes a value of $A_w$ equal to 0.85-0.89.

Preferably, the aforementioned baking step b) is carried out at a temperature comprised between 190° C. and 210° C. for a time period comprised between 9 and 11 minutes.

The aforementioned hydro-alcoholic solution is preferably a hydro-alcoholic solution of a flavouring for bakery products and is preferably a hydro-alcoholic solution of ethanol in water with a quantity of alcohol comprised between 5% and 10% of the total weight of the solution.

Preferably, in step c) of injecting a hydro-alcoholic solution the aforementioned bakery product has a "core" temperature, namely in its central part, comprised between 85° C. and 95° C.

Preferably, the aforementioned step of injecting a hydro-alcoholic solution is carried out by means of the insertion of a plurality of injectors into the bakery product, on its upper surface, said injectors being inserted vertically top-down to a level comprised between 5/10ths and 9/10ths of the height of the bakery product. In particular, the injection of the solution is carried out to a level such that said solution spreads immediately inside the bakery product in the zone where the longitudinal cutting operation will be subsequently carried out. The injection mode specified above is essential in order to achieve a homogeneous water content in the product.

The height of the bakery product is understood as meaning the distance between the lower surface of the bakery product and the upper surface thereof, calculated from the bottom.

In particular, the ratio by weight between the hydro-alcoholic solution to be injected into the bakery product and the latter is conveniently comprised between 1:5 and 1:14.

In an equally preferable manner, the aforementioned semifinished product in the form of an oblong bread roll is obtained from flour-based dough comprising a percentage of mono- and/or disaccharides comprised between 10% and 12% by weight of the total weight of the dough.

Preferably, the aforementioned longitudinal cut is carried out at a level comprised between 2/10ths and 5/10ths of the height of the product and involves from 80% to 90% of the width of the product.

The operation of carrying out said longitudinal cut to a depth less than the overall width of the product allows the aforementioned upper portion and lower portion to be not completely separated, but joined together by a strip of pastry. This measure avoids possible problems during handling of the product along the production line, such as separation of one of the two portions from the other one or their relative displacement during the subsequent steps of the process.

Preferably the aforementioned longitudinal cut is carried out after cooling of the bakery product, preferably down to a temperature less than or equal to 25° C., this cooling taking place following the aforementioned injection step c).

In a preferred embodiment this process for the production of a snack comprises a further cutting step which precedes the aforementioned baking step b). In the aforementioned further cutting step, the aforementioned semifinished product is subjected to a further superficial cutting operation carried out lengthwise on its upper surface. Preferably, the superficial cut made has a depth less than the height of the aforementioned upper portion, conveniently not more than ¾ of this height.

The height of the upper portion is understand as meaning the distance between the lower surface of the aforementioned upper portion and the upper surface thereof, calculated from the bottom.

In an even more preferred embodiment, this process for the production of a snack comprises a step in which said semifinished product is subjected to a further step of dusting with durum wheat flour over its upper surface, before said baking step.

Both the longitudinal cutting operation and the operation of dusting with durum wheat flour have the object of making the bakery product according to the invention resemble even more a bread roll produced by means of an artisanal procedure, i.e. a so-called "sfilatino" or "filoncino", so that the snack is even more appetizing and visually attractive.

According to a further preferred embodiment of the process according to the present invention, the melted chocolate used is subjected to tempering, before it is made available for the bread roll filling operations.

At the same time, the tempering operation is carried out so as to favour more rapid hardening of the chocolate, once it has been deposited, and increase the crystalline character thereof and thus make it shinier and more crunchy, once it has solidified.

Preferably, the chocolate in the melted state is also pasteurized beforehand. The pasteurization ensures that the chocolate is completely safe from a microbiological point of view; in fact, when pre-pasteurized chocolate is used, the risks of biological contamination of the snack according to the invention are eliminated entirely for conservation periods of even up to six months.

Advantageously, the chocolate used according to the invention comprises a percentage by weight of mono- and disaccharides which is relatively high, in particular comprised between 50% and 60%, and a percentage fat content which is relatively low, in particular comprised between 24% and 32%, so as to ensure a suitable viscosity at the time of deposition onto the underlying inner surface of the bread roll and make the chocolate layer more rigid and crunchier, once solidified.

In fact, once cooled to room temperature (about 20° C.), this layer assumes a consistency similar to that of a chocolate bar or slab, and has an even more vitreous texture and is even crunchier.

In particular, the weight ratio between the chocolate layer and the bakery product, understood as being the sole bakery product in the form of an oblong bread roll, is conveniently comprised between 1:2 and 1:2.5.

The step e) of deposition of the melted chocolate is generally carried out using a dispenser nozzle which comprises at least one hole and which deposits at least one strip of melted chocolate.

In a particular embodiment, the step of depositing the melted chocolate envisages that the melted chocolate is dispensed with the aid of a dispenser nozzle, comprising two holes suitably spaced from each other, and is deposited on the upper surface of the lower portion of the bakery product in the form of at least two strips. This strips, when deposited and before the chocolate solidifies, undergo widening such as to come into contact with one another and create a continuous chocolate layer, but not sufficient to cause spilling of the chocolate beyond the edges of the deposition surface.

The dough from which the semifinished product according to step a) is obtained typically comprises soft wheat flour, vegetable oils or fats, mono- and disaccharides, in particular sucrose, water, natural yeast, eggs and wheat gluten.

Preferably, this dough also comprises salt, mono- and diglycerides of fatty acids, malted barley flour, ascorbic acid and milk powder.

It has been surprisingly established that the addition of water to the bread roll, and therefore the increase in the percentage by weight of moisture to a value comprised between 30% and 33%, causes immediate hardening of the chocolate when it comes into contact with the moist surface of the bread roll.

Consequently, firstly the melted chocolate is able to be deposited in the form of a continuous layer on the underlying pastry layer, without running or overflowing, and, secondly, it does not have the tendency to be absorbed by the underlying pastry and does not penetrate into the cellular structure which characterizes this type of bakery product.

The first practical consequence of this advantageous behaviour is that a chocolate layer is obtained with a suitable and predetermined thickness, together with an interface which is defined between the chocolate layer and the surfaces of the two—upper and lower—portions exposed to contact therewith in the final form of the snack ready for consumption.

In addition, as mentioned above, the chocolate, which has a moisture content lower than that of the soft pastry of the bakery product, tends to absorb the water contained therein.

The second direct consequence of the failure of the chocolate to penetrate inside the structure of the soft pastry of the lower portion of the bread roll is that the area of contact between the chocolate layer and the internal surfaces of the bread roll is minimized, with the result that that the aforementioned undesirable effect of moisture transfer is limited and at the same time the percentage moisture content is maintained in the bakery product.

In this way, softening of the chocolate slab and simultaneous hardening of the pastry of the bread roll are avoided, these otherwise resulting in less crunchiness and the sensation of less freshness during consumption.

Moreover the proliferation of mould in the chocolate is prevented, thus ensuring that the product has a shelf life greater than that of a product which is similar, but not been made using the process according to the invention. In this context, it should be emphasized that the additional injection of water compensates, at the same time, for the natural loss of this substance by the bakery product, both during cooling thereof, once it has left the oven, and afterwards during storage of the snack. In fact, as it is known, bread and bakery products similar to bread have a natural tendency to dehydrate over time, losing not only their softness, but also most of their intrinsic organoleptic properties.

Moreover, it has been established that the injection of a hydro-alcoholic substance, optionally containing a flavouring, in accordance with the method of the invention, has a direct impact on the internal structure of the pastry of the bakery product, increasing substantially its softness such that it has a consistency and structural characteristics similar to those of a bread roll.

In particular, it should be remembered that the injection step, carried out when the bakery product is still warm, ensures a better and more rapid distribution of the hydro-alcoholic solution in the product.

In a furthermore advantageous manner, another factor which helps ensure better conservation of the product, according to the present invention, is the quantity of sugars, in the form of mono- and disaccharides, contained in the bread roll. In fact, owing to the water retention properties of these compounds, the water activity ($A_w$) in the soft pastry of the bread roll is controlled and therefore the phenomenon of migration of the water from the internal layers of the bread roll to the chocolate layer is further limited.

In addition, such a given quantity of sugars contained in the bread roll gives the snack more harmonious organoleptic properties because it reduces the contrast between the decidedly sweet taste of the chocolate and the naturally less sweet taste of the bread.

With the process according to the invention it is thus possible to provide a snack of the type in the form of an oblong bread roll filled with a chocolate layer, which can be stored at room temperature without the addition of preservatives and has organoleptic properties which remain substantially unaltered for the whole of the required shelf-life.

According to a further aspect thereof, the present invention relates to a snack comprising a soft pastry bakery product in the form of an oblong bread roll, filled with a chocolate layer in the form of a slab, which can be obtained by means of the process described above. Such a snack is characterized in that it has a moisture content comprised between 20% and 24% by weight of the total weight, a water activity ($A_w$) with a value comprised between 0.80 and 0.84, and a shelf-life of at least two weeks, preferably at least two months.

The characteristic features and advantages of the present invention will emerge more clearly from the description hereinbelow of a number of preferred embodiments, said description being provided by way of a non-limiting example.

DETAILED DESCRIPTION

Figure 1:
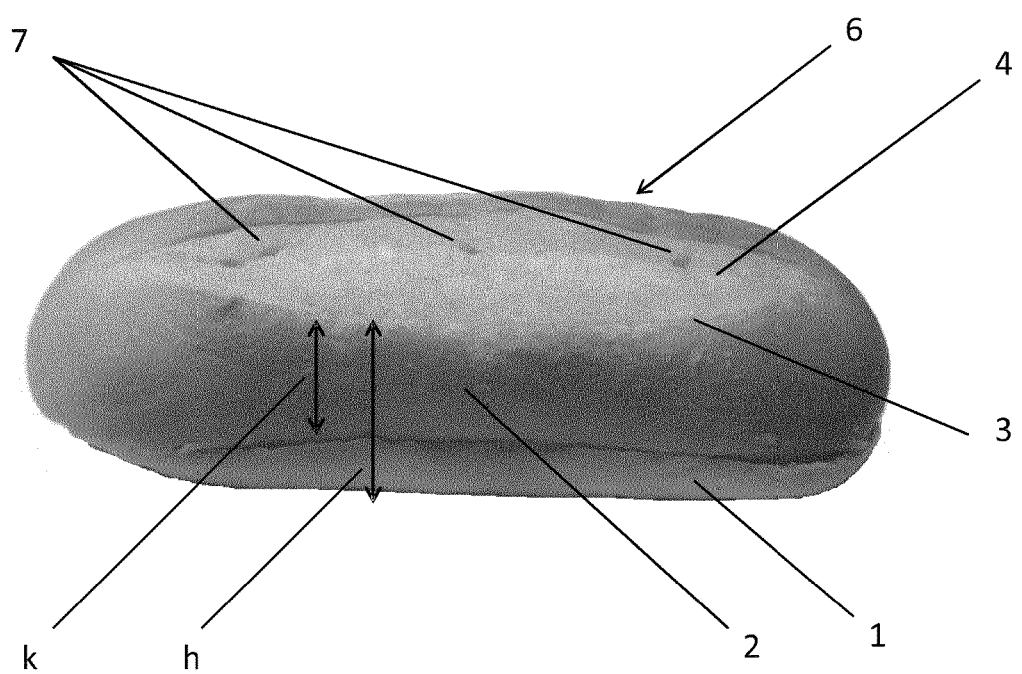
FIG. 1 shows a perspective view of a snack according to the invention.
Figure 2:
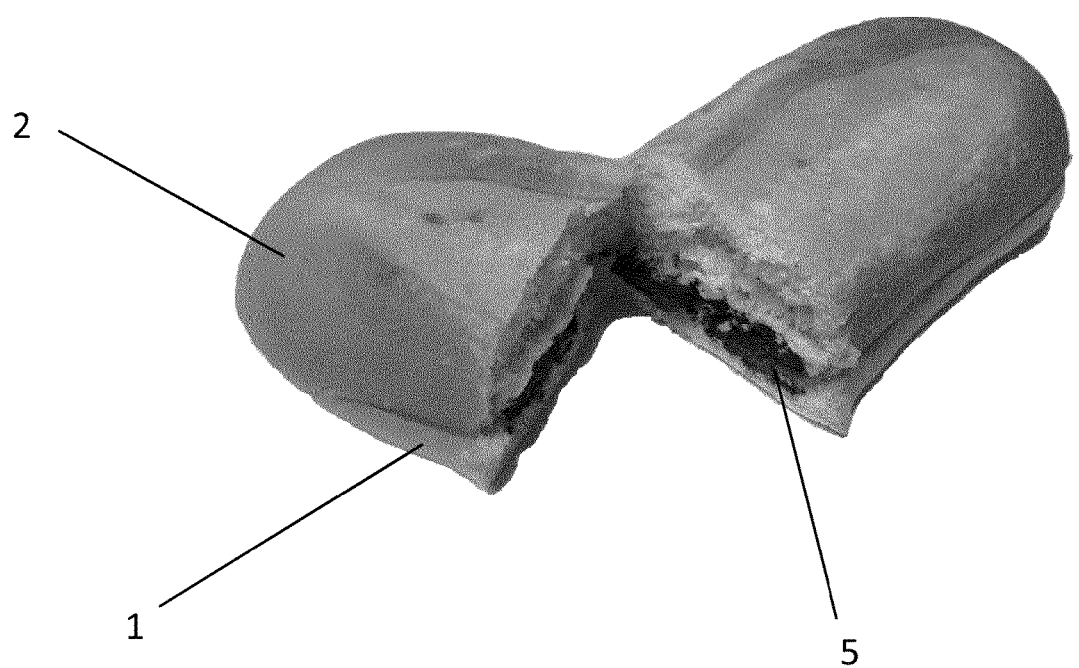
FIG. 2 shows a partially cross-sectioned view of the snack according to FIG. 1.

With reference to the process for the production of a snack according to the invention, the semifinished product in the form of an oblong bread roll for a soft pastry bakery product provided in the first step of this process was obtained by means of an entirely conventional process known to the person skilled in the art.

This semifinished product consists of a raw dough flour- and natural yeast-based, which was divided up and formed into semi-spherical portions with a weight of between 23 and 29 g. These semi-spherical portions were then processed until the desired shape, for example an elongated shape, typical of a "sfilatino" or "filoncino", was obtained. In particular, once worked into an elongated form, the aforementioned spherical portions assume a length comprised between 100 mm and 120 mm.

Finally, the dough portions, thus formed, were placed on a tray and left to rise, for a period of between 2 and 3 hours, at a temperature of between 33° C. and 37° C. and in an environment with a relative humidity of between 80% and 90% until a semifinished product in the form of an oblong bread roll, with a substantially flat lower surface and a convex upper surface, is obtained.

Optionally, at this point of the process a step is carried out where the semifinished product is subjected to a further cutting operation, similar to the cutting operation known as "scarpatura" which is traditionally performed during preparation of panettone, lengthwise along its upper surface 6. Preferably the cut made has a depth less than the height k of the aforementioned upper portion 2, conveniently equal to no more than ¾ of this height k.

As a result of this operation, after the subsequent oven baking step, the upper surface 6 of the bread roll will have a cut zone 3, slightly below the surface, defining a region 4 of the upper surface 6 of the bread roll which is lighter in appearance than the rest of the upper surface 6.

Thereafter this may be followed by a further operation where the upper surface 6 is dusted with ground durum wheat flour; in particular the quantity by weight of ground durum wheat flour applied onto each part is less than or equal to 0.3 g.

Then, the aforementioned semifinished product is baked at a temperature of between 190° C. and 210° C., for a period of between 9 and 11 minutes until a bakery product in the form of an oblong bread roll having a moisture content of between 22% and 24% by weight of the total weight of said bakery product, and a water activity ($A_w$) with a value between 0.81 and 0.85, is obtained.

Thereafter, a hydro-alcoholic solution is injected into said bakery product, when it is still warm, in an amount such as to bring the moisture content of said bakery product to a value comprised between 30% and 33% by weight of the total weight, with a water activity comprised between 0.85 and 0.89.

Preferably, in the aforementioned step where a hydro-alcoholic solution is injected, the bakery product has a "core" temperature of between 85° C. and 95° C.

In particular, the aforementioned step of injecting a hydro-alcoholic solution may be carried out by means of insertion of a plurality of injectors into the bakery product, along its upper surface 6, said injectors being inserted vertically top-down until a level comprised between 5/10ths and 9/10ths of the height h of the bakery product is obtained.

The height of the bakery product is understood as meaning the distance between the lower surface of the bakery product and the upper surface thereof, calculated from the bottom.

From FIG. 1 it can be noted that the insertion of the aforementioned injectors into the bakery product causes the formation of a plurality of holes 7 on the upper surface 6 thereof. Moreover, during the aforementioned injection step, a more or less identical amount of hydro-alcoholic solution is dispensed from each of the aforementioned injectors.

For example, if the aforementioned injection step is carried out by means of insertion of three injectors into the bakery product with a total amount of 3 g of hydro-alcoholic solution, firstly the formation of three holes in the upper surface thereof occurs, then about 1 g of hydro-alcoholic solution is dispensed by each injector.

Once the bread roll has been cooled to a temperature less than or equal to 25° C. (this requiring about 35 minutes), the subsequent longitudinal cutting step is performed so as to divide up the oblong bread roll into a lower portion 1 and an upper portion 2.

Finally, a layer of melted chocolate is deposited on the upper surface of the lower portion, said chocolate being at a temperature of between 28.5° C. and 30° C. so as to form a layer of chocolate 5 in the form of a slab.

In particular, the term "natural yeast" is understood as meaning a substance such as to induce a fermentation process of the biological type, i.e. performed by means of microorganisms without the aid of chemical yeasts. For example, leavening may be performed using beer yeast or a sourdough starter.

The formulation of the raw dough of said semifinished product comprises typically soft wheat flour, vegetable oils or fats, in particular margarine, mono- and disaccharides, in particular sucrose, water, natural yeast, e.g. beer yeast, eggs, in particular fresh eggs, and wheat gluten and may contain also salt, mono- and diglycerides of fatty acids, malted barley flour, ascorbic acid and milk powder, in particular whole milk powder.

In particular, as known to the person skilled in the art, eggs favour emulsification in the dough of the vegetable oils or the margarine. Gluten, instead, is added with the aim of reinforcing the structure of the pastry of the semifinished product, beforehand, and of the bakery product, afterwards.

The malted barley flour is added as a natural leavening enhancer. This type of flour contains in fact generally different varieties of enzymes, such as alpha and beta amylase, which have the function of depolymerizing the starch contained in the dough into simple sugars which are useful for the metabolism of the yeast and, in this way, are immediately available. Basically, this ingredient not only allows a more rapid and greater expansion of the volume of the bread and the formation of a regular cell structure, but also provides the surface crust with improved organoleptic characteristics and gives it a deeper colour.

The ascorbic acid increases the mechanical tolerance of the dough, avoiding any kneading problems, improves the glutinous network, ensuring a good consistency of the pastry and limiting collapsing of the dough, and also guarantees the further stability of the product under different environmental conditions.

The milk, furthermore, has the function of favouring the Maillard reaction so as to facilitate the formation of the typical golden-brown colouring on the surface of the roll after baking.

With reference to the chocolate mixture used for the filling, this mixture comprises preferably a percentage of milk chocolate and a percentage of plain chocolate.

As already mentioned previously, this mixture may preferably be subjected to a tempering operation in order to improve the properties both of the melted chocolate and of the chocolate layer in the finished product, also in terms of storage.

Tempering is the last of the operations which is normally carried out on the chocolate during its production.

Since it consists mainly of a crystalline solid composed of molecules of certain particular triglycerides, cocoa butter is the ingredient which gives the chocolate its structure. It can crystallize in different ways, or rather, in different polymorphous forms; however, not all the possible crystalline forms give the finished product, i.e. the chocolate, the desired properties, such as crunchiness and shininess, stably over time.

Tempering consists in heating the mixture of ingredients for formulation of the chocolate, or the chocolate previously produced, to a temperature such as to break the crystal structures of the cocoa butter present therein. Then, the mixture is cooled so as to form only specific crystal forms and finally is reheated again with the aim of destroying once more the less stable and undesirable crystal forms which otherwise, during the shelf life of the chocolate obtained, would reappear on the surface of the chocolate in the form of white crystals.

The chocolate used in the process according to the invention is obtained by combining plain chocolate with milk chocolate, and the mixture thus obtained is heated to a temperature of 45° C. Thereafter, this mixture of melted chocolate is cooled. The mixture is then allowed to cool to a temperature for use, ranging between 28.5° C. and 30° C., as mentioned above. Then, the chocolate is distributed and deposited melted in accordance with the process of the present invention.

Finally, the finished product, understood as meaning a snack comprising a soft pastry bakery product in the form of an oblong bread roll, filled with a chocolate layer in the form of a slab, generally with a weight of not more than 50 g, preferably a weight of between 35 g and 40 g, is obtained.

Example 1

Preparation of a Snack According to the Invention.

Firstly a semifinished product for a soft pastry bakery product was prepared. It was obtained from a raw dough prepared using the following ingredients:

| Ingredient | Percentage (%) |
| --- | --- |
| Soft-wheat flour | 53 |
| Wheat gluten | 0.6 |
| Whole milk powder | 1 |
| Vegetable margarine | 6 |
| Fresh eggs | 8.6 |
| Beer yeast | 2.4 |
| Water | 15.5 |
| Salt | 0.6 |
| Mono- and diglycerides of fatty acids | 1.1 |
| Sucrose | 11.2 |

The percentages shown above are to be understood as being by weight in relation to the total weight of the ingredients.

Using the aforementioned ingredients a dough was obtained by means of mixing in a fork kneader with a variable mixing speed. In particular, a slow mixing step was carried out for a period of 3 minutes, followed by a fast mixing step for a period of 20 minutes, in turn followed by a slow mixing step for a period of 4 minutes, so that the dough underwent mixing for a total time of 27 minutes. Then the dough was divided up and formed into semi-spherical portions with a weight of 26 g. These semi-spherical portions were then worked into the oblong form typical of a sfilatino with a length of about 100 mm.

Finally, the dough portions, thus formed, were placed on a tray and allowed to rise during 150 minutes at a temperature of 35° C. in an environment with a relative humidity of 85% until a semifinished product was obtained.

The semifinished product, once it had risen, was baked at a temperature of 200° C. for a period of 10 minutes. A soft pastry bakery product in the form of a sfilatino with a moisture content of 23% by weight, a water activity ($A_w$) of 0.83 and a weight of 23.5 g was thus obtained. Then, 3 g of a hydro-alcoholic solution, comprising 7% by weight of ethanol relative to the total weight of the solution, were injected into said bakery product, while said product was still warm, more precisely at the temperature of 90° C. A bread roll with a moisture content of 31.5% by weight, a water activity ($A_w$) of 0.87 and a weight of 26.5 g was thus obtained. Then, the bakery product was allowed to cool for a period of 35 minutes until it reached a temperature of 24° C.

Thereafter, using conventional cutting means, a longitudinal cut was performed so as to divide said bakery product into an upper portion and a lower portion.

The cut was carried out at a height of 1 cm, the height of said bakery product being equal to 3.5 cm. In particular, this cut was performed so as to involve 85% of the width of the product.

The melted chocolate was prepared from a chocolate mixture comprising 40% milk chocolate and 60% plain chocolate.

Plain chocolate comprising ingredients in the following percentage amounts by weight relative to the total weight of the plain chocolate was used: 54.5% sucrose, 44% cocoa paste, 1% cocoa butter and 0.5% vanillin plus sunflower lecithin. Together therewith milk chocolate comprising ingredients in the following percentage amounts by weight relative to the total weight of the milk chocolate was also used: 42.5% sucrose, 22.2% whole milk powder, 17% cocoa butter, 13% cocoa paste, 5% lactose and 0.3% vanillin plus sunflower lecithin.

Said plain chocolate and said milk chocolate were mixed and subsequently were melted at a temperature of 45° C. until a mixture in fluid form was obtained. Then the fluid chocolate thus obtained was cooled. Finally, the mixture was brought to a temperature of 29° C. so that it could be used for the following bread roll filling operations.

Then, 11.5 g of melted chocolate were deposited, at the temperature of 29° C., on top of the upper surface of the lower portion of the bakery product. The melted chocolate was thus subject to a fast solidification and compaction process from the moment of initial contact with the moist surface of the aforementioned lower portion, so as to form a continuous slab of chocolate.

In this way, the snacks obtained had a weight of 38 g, a moisture content of 22% by weight of the total weight of the finished product and a water activity ($A_w$) with a value of 0.82.

The aforementioned snacks were individually packaged in sealed polypropylene wrappers and tested for their shelf life at room temperature.

After a period of 75 days no microbiological alterations or significant variations in the organoleptic properties of the products were determined.

Example 2

Preparation of a Snack According to the Invention.

Firstly a semifinished product for a soft pastry bakery product was prepared. It was obtained from a raw dough prepared using the following ingredients:

| Ingredient | Percentage (%) |
| --- | --- |
| Soft-wheat flour | 52 |
| Wheat gluten | 1.3 |
| Whole milk powder | 1.1 |
| Vegetable margarine | 8 |
| Fresh eggs | 9.5 |

-continued

| Ingredient | Percentage (%) |
| --- | --- |
| Beer yeast | 2.4 |
| Water | 13.5 |
| Salt | 0.6 |
| Mono- and diglycerides of fatty acids | 0.8 |
| Sucrose | 10.8 |

The percentages shown above are to be understood as being by weight in relation to the total weight of the ingredients.

Using the aforementioned ingredients a dough was obtained by means of mixing in a fork kneader with a variable mixing speed. In particular, a slow mixing step was carried out for a period of 3 minutes, followed by a fast mixing step for a period of 20 minutes, in turn followed by a slow mixing step for a period of 4 minutes, so that the dough underwent mixing for a total time of 27 minutes. Then the dough was divided up and formed into semi-spherical portions with a weight of 27 g. These semi-spherical portions were then worked into the oblong form typical of a sfilatino with a length of about 105 mm.

Finally, the dough portions, thus formed, were placed on a tray and allowed to rise during 155 minutes at a temperature of 35° C. in an environment with a relative humidity of 85% until a semifinished product was obtained.

The semifinished product, once it had risen, was then cut lengthwise along its upper surface. This cut was made to a depth of 0.8 cm relative to the upper surface of the semifinished product, this semifinished bakery product having a vertical height of about 2.5 cm. At the same time, 0.25 g of durum wheat flour were dusted over the upper surface of the semifinished product.

Then, this semifinished product was baked at a temperature of 195° C. for a period of 11 minutes. A soft pastry bakery product in the form of a sfilatino with a moisture content of 22.8% by weight, a water activity ($A_w$) of 0.84 and a weight of 24.5 g was thus obtained. Then, 2.5 g of a hydro-alcoholic flavouring solution, comprising 7% by weight of ethanol relative to the total weight of the solution, were injected into said bakery product, while said product was still warm (90° C.). A bread roll with a moisture content of 31.1% by weight, a water activity ($A_w$) of 0.86 and a weight of 27 g was thus obtained. Then, the bakery product was allowed to cool for a period of 20 minutes until it reached a temperature of 24° C.

Thereafter, using conventional cutting means, a longitudinal cut was performed so as to divide said bakery product into an upper portion and a lower portion.

The cut was made at a height of 1.3 cm, the height of said bakery product being equal to 3.5 cm. In particular, this cut was made so as to involve 85% of the width of the product.

The melted chocolate was prepared from a chocolate mixture comprising 40% milk chocolate and 60% plain chocolate.

Plain chocolate comprising ingredients in the following percentage amounts by weight relative to the total weight of the plain chocolate was used: 54.5% sucrose, 44% cocoa paste, 1% cocoa butter and 0.5% vanillin plus sunflower lecithin. Together therewith milk chocolate comprising ingredients in the following percentage amounts by weight relative to the total weight of the milk chocolate was also used: 42.5% sucrose, 22.2% whole milk powder, 17% cocoa butter, 13% cocoa paste, 5% lactose and 0.3% vanillin plus sunflower lecithin.

Said plain chocolate and said milk chocolate were mixed and subsequently were melted at a temperature of 45° C. so as to obtain a mixture in fluid form. Then, the fluid chocolate thus obtained was cooled. Finally the mixture was brought to a temperature of 29° C. so that it could be used for the following bread roll filling operations.

Then 11.3 g of melted chocolate were deposited on top of the upper surface of the lower portion of the bakery product; this operation was carried with the aid of two nozzles so as to deposit the chocolate in the form of two separate strips.

The melted chocolate was thus subject to a fast solidification and compaction process from the moment of initial contact with the moist surface of the aforementioned lower portion, so as to form a continuous slab of chocolate.

In this way, the snacks obtained had a weight of 38.3 g, a moisture content of 22.8% by weight of the total weight of the finished product and a water activity ($A_w$) with a value of 0.82.

The aforementioned snacks were individually packaged in sealed polypropylene wrappers and tested for their shelf life at room temperature.

After a period of two months no microbiological alterations or significant variations in the organoleptic properties of the products were determined.

The invention claimed is:

1. A process for the production of a snack comprising a soft pastry bakery product in the form of an oblong bread roll, filled with a chocolate layer in the form of and with the consistency of a slab, comprising:
   a) providing a semifinished product in the form of an oblong bread roll, obtained from a flour-based dough, leavened with natural yeast,
   b) baking said semifinished product, obtaining a bakery product in the form of an oblong bread roll having a moisture content of between 22% and 24% by weight of the total weight of said bakery product,
   c) injecting a hydro-alcoholic solution into said bakery product, while said bakery product has a temperature of between 85° C. and 95° C. in its central part, in such a quantity as to bring the moisture content of said bakery product to a value of between 30% and 33% by weight of its total weight,
   d) carrying out a longitudinal cut on the bakery product at or below half of its height (h) and in such a way as to involve at least 80% of its length, thus obtaining a lower portion and an upper portion,
   e) depositing a layer of melted chocolate onto the upper surface of said lower portion; and
   f) cooling said layer of chocolate to room temperature whereby the melted chocolate forms a layer in the form of and with the consistency of a slab.

2. The process according to claim 1, wherein said bakery product obtained by baking in step b) has a value of $A_w$ equal to 0.81-0.85 and, following step c), has a value of $A_w$ equal to 0.85-0.89.

3. The process according to claim 1, wherein said baking step b) is carried out at a temperature of between 190° C. and 210° C. for a time period of between 9 and 11 minutes.

4. The process according to claim 1, wherein said hydro-alcoholic solution is a water solution of ethanol with a quantity of alcohol of between 5% and 10% of the total weight of the solution.

5. The process according to claim 4, wherein said hydro-alcoholic solution is a hydro-alcoholic solution of a flavoring for bakery products.

6. The process according to claim 4, wherein the ratio by weight between the hydro-alcoholic solution to be injected into the bakery product in step c) and the latter is between 1:5 and 1:14.

7. The process according to claim 1, wherein said flour-based dough comprises a percentage of mono- and/or disaccharides between 10% and 12% by weight of the total weight of the dough.

8. The process according to claim 1, wherein said longitudinal cut in step d) is carried out at a level of between 2/10ths and 5/10ths of the height (h) of the bakery product and involves from 80% to 90% of the width of the bakery product.

9. The process according to claim 1, wherein said longitudinal cut is carried out after cooling the bakery product, said cooling occurring after the injection of step c).

10. The process according to claim 9, wherein said bakery product is cooled down to a temperature lower than or equal to 25° C.

11. The process according to claim 1, wherein said step c) of injecting a hydro-alcoholic solution is carried out by means of the insertion of a plurality of injectors into the bakery product, on its upper surface, said injectors being vertically inserted top-down to a level of between 5/10ths and 9/10ths of the height (h) of the bakery product.

12. The process according to claim 1, wherein said baking step b) is preceded by a superficial cutting step a'), said superficial cut being carried out lengthwise on the upper surface of said semifinished product.

13. The process according to claim 12, wherein said superficial cut has a depth lower than the height (k) of said upper portion.

14. The process according to claim 1, wherein, before said baking step b), said semifinished product is subjected to a step of dusting durum wheat flour over the upper surface of said upper portion.

15. The process according to claim 1, wherein said melted chocolate is previously tempered.

16. The process according to claim 1, wherein said melted chocolate comprises a percentage of mono- and disaccharides of between 50% and 60% by weight, and a percentage fat content of between 24% and 32% by weight.

17. The process according to claim 1, wherein the ratio by weight between the chocolate layer and said bakery product is between 1:2 and 1:2.5.

18. The process according to claim 1, wherein, in deposition step e), said melted chocolate is dispensed through a dispenser nozzle, comprising at least one hole, and deposited in the form of at least one strip on the upper surface of the lower portion of the bakery product.

19. The process according to claim 18, wherein, in depositing step e), said melted chocolate is dispensed through a dispenser nozzle, comprising at least two holes suitably spaced from each other, and deposited in the form of two strips onto the upper surface of the lower portion of the bakery product, said strips undergoing widening sufficient for them to come into contact with one another to create a continuous chocolate layer, but not to cause spilling of the chocolate beyond the edges of the deposition surface.

20. The process according to claim 1, wherein said dough comprises soft wheat flour, vegetable oils or fats, mono- and disaccharides, in particular sucrose, water, natural yeast, eggs and wheat gluten.

21. The process according to claim 20, wherein said dough further comprises salt, mono- and diglycerides of fatty acids, malted barley flour, ascorbic acid and milk powder.

* * * * *